United States Patent [19]

Sharpe

[11] 3,895,023

[45] July 15, 1975

[54] ANTIINFLAMMATORY 1,2,4-OXADIAZOLIDINE-3,5-DIONES

[75] Inventor: Thomas R. Sharpe, Wilmington, Del.

[73] Assignee: E. I. du Pont de Nemours & Company, Wilmington, Del.

[22] Filed: Feb. 6, 1973

[21] Appl. No.: 330,015

[52] U.S. Cl............ 260/307 B; 260/471 C; 424/272
[51] Int. Cl............................................. C07d 85/52
[58] Field of Search .................................. 260/307 B

[56] References Cited
UNITED STATES PATENTS 3,437,664   4/1969   Krenzer ............................ 260/307
3,668,216   6/1972   Zschocke ....................... 260/307 B

*Primary Examiner*—Donald G. Daus
*Assistant Examiner*—Raymond V. Rush

[57] ABSTRACT

Certain 2-(substituted phenyl)-1,2,4-oxadiazolidine-3,5-diones - which may also carry a methyl, ethoxycarbonyl, or methoxycarbonyl substituent in the 4-position — are useful antiinflammatory agents. Instead of the free 4-unsubsituted oxadiazolidinediones of the present invention, their sodium, potassium, ammonium, calcium, or magnesium salts may be used.

2 Claims, No Drawings

ANTIINFLAMMATORY 1,2,4-OXADIAZOLIDINE-3,5-DIONES

BACKGROUND OF THE INVENTION

This invention primarily relates to the use of certain 2-aryl-1,2,4-oxadiazolidine-3,5-diones as antiinflammatory agents.

U.S. Pat. No. 3,437,664 (to Krenzer) discloses novel herbicidal 1,2,4-oxadiazolidine-3,5-diones having the general formula (1), below:

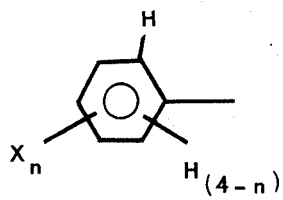 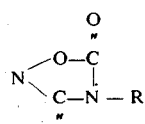 (1)

wherein R is a $C_1$-$C_3$ alkyl or a $C_3$ alkenyl; X can be, among others, halogen, lower haloalkyl, or lower alkoxyl; and n is an integer of 0–4.

Vsevolozhskaya et al., J. Org. Chem. (U.S.S.R.), English translation (Consultants Bureau) 7 (No. 5), 939 (1971), reports 2-aryl-1,2,4-oxadiazolidine-3,5-diones represented by the following formula (2):

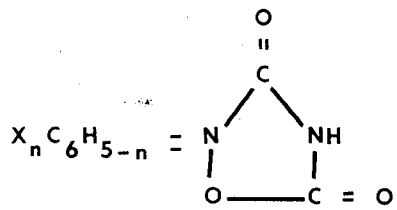 (2)

wherein $X_n$ is hydrogen, 3-Cl, 4-Cl, 3,4-$Cl_2$, 2-$CH_3$, 3-$CH_3$, and 3-$NO_2$. This publication also describes the preparation of the sodium salt of the oxadiazolidinedione in which $X_n$ is hydrogen. No pharmaceutical utility is suggested by the authors for any compounds described in this reference.

SUMMARY OF THE INVENTION

According to this invention, there is now provided a class of useful antiinflammatory agents containing as the active ingredient at least one compound represented by the following formula (3):

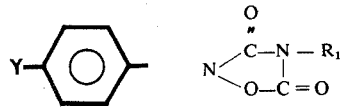 (3)

wherein Y is chlorine, bromine, trifluoromethyl, or trifluoromethoxyl; and $R_1$ is hydrogen, methyl, the -$COOR_2$ group, or a univalent cation selected from $Na^+$, $K^+$, $NH_4^+$, 1/2 $Ca^{++}$, and 1/2 $Mg^{++}$;

$R_2$ being methyl or ethyl.

DETAILED DESCRIPTION OF THE INVENTION

The 4-unsubstituted 1,2,4-oxadiazolidine-3,5-diones of the present invention can be readily made by the alkaline cyclization of the corresponding methyl or ethyl 4-aryl-4-hydroxyallophanates, for example, as follows:

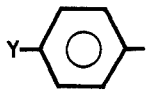 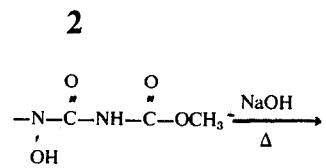

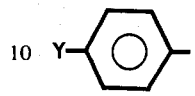 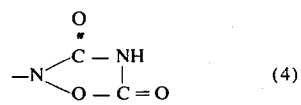 (4)

The 4-methyl-1,2,4-oxadiazolidine-3,5-diones of the present invention are made by the method of U.S. Pat. No. 3,437,664 by reaction of the corresponding 1-aryl-1-hydroxy-3-methylurea with ethyl chloroformate in the presence of an alkali. This reaction is shown below:

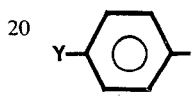 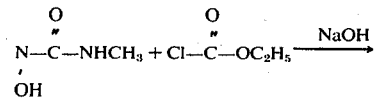

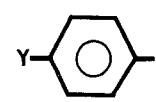 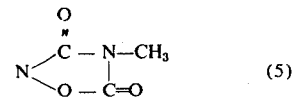 (5)

The 4-ethoxycarbonyl- and 4-methoxycarbonyl-1,2,4-oxadiazolidine-3,5-diones of the present invention are best made by reaction of the 4-unsubstituted compounds (4) above, with ethyl or methyl chloroformate, respectively, under anhydrous conditions and in the presence of potassium t-butoxide. This is shown in the following equation:

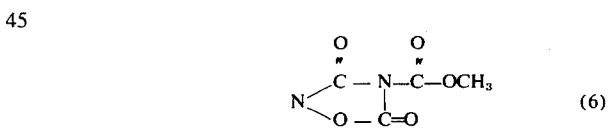 (6)

Salts of the oxadiazolidinediones of formula (4) with sodium, potassium, ammonium, calcium, or magnesium ions are made by the neutralization of the oxadiazolidinediones with appropriate bases.

It will be readily recognized that several compounds within the scope of this invention which are useful as antiinflammatory agents are known from prior art. Others have not heretofore been reported. This invention is, therefore, primarily directed to pharmaceutical antiinflammatory preparations containing one or more compounds represented by formula (3), above, and to methods of treating inflammatory conditions of the body with compounds of formula (3). It also is directed to novel 1,2,4-oxadiazolidine-3,5-diones within the scope of formula (3).

The preparation of various compounds contemplated by the present invention is now illustrated by the following representative examples wherein all parts, proportions, and percentages are by weight unless indicated otherwise.

EXAMPLE 1

2-(4-Chlorophenyl)-1,2,4-oxadiazolidine-3,5-dione

A.

A mixture of 4-chloronitrobenzene (55.3 g., 0.351 mole), ammonium chloride (21.3 g., 0.398 mole), and water (500 ml.) is heated to 75° with mechanical stirring under an atmosphere of nitrogen. Heating is discontinued while zinc dust (49.0 g., 0.712 g.atom) is added portionwise. After stirring 1-½ hrs. at room temperature, methylene chloride (500 ml.) is added and the mixture filtered. The organic phase is separated and dried with sodium sulfate. The dried solution of N-(4-chlorophenyl)hydroxylamine is cooled in an ice bath under nitrogen, and a solution of methoxycarbonyl isocyanate (35.5 g., 0.351 mole) in methylene chloride (100 ml.) is added dropwise. After stirring in the ice bath for 45 min., the product is collected and washed with cold methylene chloride. There is obtained 50.0 g. of methyl 4-(4-chlorophenyl)-4-hydroxyallophanate, a nearly colorless solid, m.p. 144° (dec.). Trituration with acetone gives pure, colorless material, m.p. 160° (dec.).

B.

A mixture of methyl 4-(4-chlorophenyl)-4-hydroxyallophanate (45.0 g., 0.184 mole), 6 N sodium hydroxide (35 ml), and water (250 ml.) is heated at 70°–75° for 15 min. The mixture is cooled and diluted with water (300 ml.). The solution is extracted twice with ether. The aqueous phase is acidified with 10 percent HCl, and the product is extracted with two portions of ethyl acetate. The ethyl acetate extract is dried with magnesium sulfate. Removal of the solvent at reduced pressure gives 35.2 g. of a faintly pink solid, m.p. 152.5°. Recrystallization from toluene-ethyl acetate gives 21.7 g. of 2-(4-chlorophenyl)-1,2,4-oxadiazolidine-3,5-dione as nearly colorless platelets, m.p. 156° (dec.).

EXAMPLE 2

2-(4-Bromophenyl)-1,2,4-oxadiazolidine-3,5-dione

A.

A mixture of 4-bromonitrobenzene (20.2 g., 0.100 mole), ammonium chloride (6.1 g.), zinc dust (13.1 g., 0.200 g.atom), ethanol (140 ml.), and water (60 ml.) is heated to 65°. The mixture is then stirred for 2 hrs. without heating. The solid is filtered off, and the filtrate is evaporated to dryness under reduced pressure. The residue is dissolved in methylene chloride and dried with sodium sulfate. To this dried solution cooled in an ice bath is added dropwise ethoxycarbonyl isocyanate (8.6 g., 0.075 mole) in methylene chloride (25 ml.). The colorless solid is collected by filtration. There is obtained 14.8 g. of ethyl 4-(4-bromophenyl)-4-hydroxyallophanate, m.p. 157° (dec.).

B.

A mixture of ethyl 4-(4-bromophenyl)-4-hydroxyallophanate (8.0 g., 0.0264 mole), 1N NaOH (30 ml.), and water (100 ml.) is heated at 55°–60° for 15 min. The mixture is cooled and extracted with ether. The aqueous phase is acidified with 10 percent HCl and the solid collected and washed with water. There is obtained 6.5 g. of faintly pink crystals, m.p. 170° (dec.). Recrystallization from ethanol gives colorless 2-(4-bromophenyl)-1,2,4-oxadiazolidine-3,5-dione, m.p. 174° (dec.).

EXAMPLE 3

2-(4-Trifluoromethoxyphenyl)-1,2,4-oxadiazolidine-3,5-dione

A.

To a stirred mixture of 4-trifluoromethoxynitrobenzene (18.7 g., 0.0903 mole), ammonium chloride (5.5 g.), and 70 percent ethanol (200 ml.) is added zinc dust (11.8 g., 0.180 g.atom). Stirring is continued for 1 hr. at room temperature. The solid is filtered off and washed with hot ethanol. The filtrate is evaporated under reduced pressure, and the residue is dissolved in methylene chloride and dried with sodium sulfate. To this dried solution cooled in an ice bath is added ethoxycarbonyl isocyanate (8.0 g., 0.075 mole) in methylene chloride (25 ml.). After stirring for 2 hrs. in an ice bath, the solid is collected and washed with cold methylene chloride. There is obtained 15.0 g. of ethyl 4-(4-trifluoromethoxyphenyl)-4-hydroxyallophanate, m.p. 165.5° (dec.).

B.

A mixture of ethyl 4-(4-trifluoromethoxyphenyl)-4-hydroxyallophanate (5.5 g., 0.0179 mole), 1N NaOH (25 ml), and water (100 ml) is heated at 55°–61° for 15 min. The mixture is cooled and extracted with ether. The aqueous phase is acidified with 10 percent HCl and extracted with ethyl acetate. The ethyl acetate extract is washed with water and dried with magnesium sulfate. Evaporation of the solvent and recrystallization of the residue from toluene gives 3.4 g. of colorless 2-(4-trifluoromethoxyphenyl)-1,2,4-oxadiazolidine-3,5-dione, m.p. 145.5°–146°.

EXAMPLE 4

2-(4-Trifluoromethylphenyl)-1,2,4-oxadiazolidine-3,5-dione

A.

Using 4-trifluoromethylnitrobenzene in place of the 4-trifluoromethoxynitrobenzene of Example 3A gives nearly colorless ethyl 4-(4-trifluoromethylphenyl)-4-hydroxyallophanate, m.p. 177.5°(dec.). Recrystallization from ethanol gives colorless material, m.p. 179°(dec.).

B.

A mixture of ethyl 4-(4-trifluoromethylphenyl)-4-hydroxyallophanate (6.0 g., 0.0205 mole), 1N NaOH (25 ml), and water (50 ml) is heated at 52°–67° for 20 min. The mixture is cooled and extracted with ether. The aqueous phase is acidified with 10 percent HCl and is extracted twice with ethyl acetate. The combined ethyl acetate extracts are dried with magnesium sulfate. Evaporation of the solvent and recrystallization of the residue from toluene gives 3.2 g. of colorless 2-(4-trifluoromethylphenyl)-1,2,4-oxadiazolidine-3,5-dione, m.p. 173.5°–174.5°.

EXAMPLE 5

2-(4-Trifluoromethoxyphenyl)-1,2,4-oxadiazolidine-3,5-dione sodium salt 2-(4Trifluoromethoxyphenyl)-1,2,4-oxadiazolidine-3,5-dione (2.50 g., 0.00955 mole) in ethanol (50 ml.) is treated with 1N NaOH (9.6 ml.). Evaporation of the solvent under reduced pressure gives 2-(4- trifluoromethoxyphenyl)-1,2,4-oxadiazolidine-3,5-dione sodium salt, m.p. 294° (dec.).

By using this procedure, one can also prepare the sodium salts of the other above-described oxadiazolidinediones.

Ammonium, potassium, magnesium, and calcium salts of the above-described oxadiazolidinediones can be prepared by using similar procedures.

EXAMPLE 6

2-(4-Chlorophenyl)-4-methyl-1,2,4-oxadiazolidine-3,5-dione

To a mixture of 1-(4-chlorophenyl)-1-hydroxy-3-methylurea (17.0 g., 0.0848 mole), 1N NaOH (95 ml.), and glyme (200 ml.) cooled in an ice bath is added dropwise a solution of ethyl chloroformate (10.3 g., 0.0948 mole) in glyme (25 ml.). After stirring for 1 hr. in the ice bath, the solvent is evaporated under reduced pressure and the residue extracted with chloroform. The chloroform phase is washed with water and dried with magnesium sulfate. Removal of solvent under reduced pressure and recrystallization of the residue from methyl cyclohexane-ethyl acetate gives 7.9 g. of 2-(4-chlorophenyl)-4-methyl-1,2,4-oxadiazolidine-3,5-dione, m.p. 117.5°–118°.

EXAMPLES 7–9

By repeating the procedure of Example 6 and substituting the indicated urea for that of Example 6, one obtains the indicated product.

| Example | Urea Reactant | Product |
|---|---|---|
| 7 | 1-(4-bromophenyl)-1-hydroxy-3-methylurea | 2-(4-bromophenyl)-4-methyl-1,2,4-oxadiazolidine-3,5-dione |
| 8 | 1-(4-trifluoromethylphenyl)-1-hydroxy-3-methylurea | 2-(4-trifluoromethylphenyl)-4-methyl-1,2,4-oxadiazolidine-3,5-dione |
| 9 | 1-(4-trifluoromethoxyphenyl)-1-hydroxy-3-methylurea | 2-(4-trifluoromethoxyphenyl)-4-methyl-1,2,4-oxadiazolidine-3,5-dione |

EXAMPLE 10

2-(4-Chlorophenyl)-4-ethoxycarbonyl-1,2,4-oxadiazolidine-3,5-dione

To a mixture of 2-(4-chlorophenyl)-1,2,4-oxadiazolidine-3,5-dione (7.6 g., 0.0357 mole), potassium t-butoxide (4.0 g., 0.0357 mole), and glyme (150 ml.) there is added in one portion ethyl chloroformate (3.9 g., 0.0359 mole). After refluxing for 1-¼ hr. the mixture is cooled and poured into ice water. The solid is collected, washed with water, and recrystallized from ethanol to give 7.7 g. of 2-(4-chlorophenyl)-4-ethoxycarbonyl-1,2,4-oxadiazolidine-3,5-dione, m.p. 112°–112.5°.

By substituting methyl chloroformate for the ethyl chloroformate of this Example, one can obtain 2-(4-chlorophenyl)-4-methoxycarbonyl-1,2,4-oxadiazolidine-3,5-dione.

EXAMPLES 11–13

By repeating the procedure of Example 10 and substituting the indicated oxadiazolidinedione for that of Example 10, one obtains the indicated product.

| Example | Oxadiazolidinedione Reactant | Product |
|---|---|---|
| 11 | 2-(4-bromphenyl)-1,2,4-oxadiazolidine-3,5-dione | 2-(4-bromophenyl)-4-ethoxycarbonyl-1,2,4-oxadiazolidine-3,5-dione |
| 12 | 2-(4-trifluoromethylphenyl)-1,2,4-oxadiazolidine-3,5-dione | 2-(4-trifluoromethylphenyl)-4-ethoxycarbonyl-1,2,4-oxadiazolidine-3,5-dione |
| 13 | 2-(4-trifluoromethoxyphenyl)-1,2,4-oxadiazolidine-3,5-dione | 2-(4-trifluoromethoxyphenyl)-4-ethoxycarbonyl-1,2,4-oxadiazolidine-3,5-dione |

EXAMPLES 14–16

By repeating Example 10 but substituting the indicated oxadiazolidinedione for that of Example 10 and methyl chloroformate for the ethyl chloroformate of Example 10, one obtains the indicated product.

| Example | Oxadiazolidinedione Reactant | Product |
|---|---|---|
| 14 | 2-(4-bromophenyl)-1,2,4-oxadiazolidine-3,5-dione | 2-(4-bromophenyl)-4-methoxycarbonyl-1,2,4-oxadiazolidine-3,5-dione |
| 15 | 2-(4-trifluoromethylphenyl)-1,2,4-oxadiazolidine-3,5-dione | 2-(4-trifluoromethylphenyl)-4-methoxycarbonyl-1,2,4-oxadiazolidine-3,5-dione |
| 16 | 2-(4-trifluoromethoxyphenyl)-1,2,4-oxadiazolidine-3,5-dione | 2-(4-trifluoromethoxyphenyl)-4-methoxycarbonyl-1,2,4-oxadiazolidine-3,5-dione |

The antiinflammatory activity of the compounds of the present invention was demonstrated in the following test:

Male, CFE rats, weighing 150–200 grams were injected subcutaneously with 0.1 ml of a suspension of *Myobacterium butyricum* (Difco heat-killed, lyophilized cells) in mineral oil (5 mg/ml) into the plantar area of the right hind paw. Mineral oil injected rats served as non-arthritic controls.

A period of 14 days was allowed for the arthritic process to develop maximally. The volume of the left hind paw (uninjected) of each rat was then measured by mercury displacement. The animals were rearranged into balanced groups of 10 (according to the degree of arthritic disease as indicated by paw size).

Drug treatment was begun on day 14, after the paw volume measurement and was continued for 7 days. Drugs were intubated once daily in 1 ml per 100 grams of body weight of PVA-Acacia medium (polyvinyl alcohol 1 percent, gum acacia 5 percent, and methylparaben 0.5 percent). Paw volumes were measured again 24 hours after the last dose.

The paw volume measurement was recorded as the meter reading from a transducer-indicator that expressed proportionately the effect of mercury displacement on a suitably orientated strain gauge. The system was calibrated with a metal rod of known volume. The conversion of the mean meter reading to ml was obtained from a standard curve.

Increase in the paw volume of the uninjected hind paw is proportional to the development of arthritis in adjuvant-injected rats. Inhibition of paw volume increase in drug treated rats is indicative of antiarthritic activity.

The compounds were tested at three or more dose levels. Dose-response curves were constructed for percent inhibition of the treated group mean paw volume increases as compared to control group mean paw volume increase. The dose (mg/kg) required to produce 50 percent inhibition of the mean paw volume increase (ED50) was determined from the dose response curve.

The results of the test are presented in the following table.

sired Usually a daily dosage of active ingredient compound will be from about 0.1 to 50 milligrams per kilogram of body weight. Ordinarily from 0.5 to 16 and preferably 1 to 4 milligrams per kilogram per day in one or more applications per day is effective to obtain desired results.

Besides the active ingredient compound of this invention, the composition will contain a solid or liquid nontoxic pharmaceutical carrier for the active ingredient and may also contain other additives such as lubricants, binding agents, disintegrants, preservatives, colorants and flavors, which are common to the art.

In one embodiment of a pharmaceutical composition of this invention, the dosage form is a capsule which can be of the ordinary gelatin type. In the capsules will be from about 5 to 90 percent by weight of a compound of the invention and 95 and 10% of a carrier. In another embodiment, the active ingredient is tableted with a suitable diluent.

ANTI-INFLAMMATORY ACTIVITY
ESTABLISHED ADJUVANT-INDUCED ARTHRITIS IN RATS

| COMPOUND | DAILY ORAL DOSE (mg/kg) | | PAW VOLUME (ml) | | % DECREASE FROM CONTROL | | ED 50% DECREASE FROM CONTROL PAW VOLUME (mg/kg) |
|---|---|---|---|---|---|---|---|
| | Test No. 1 | Test No. 2 | Test No. 1 | Test No. 2 | Test No. 1 | Test No. 2 | |
| 2-(4-chlorophenyl)- | 0 (Control) | 0 (Control) | 2.83 | 2.65 | — | — | |
| 1,2,4-oxadiazo-lidine-3,5-dione | 2.5 | | 2.69 | | 13 | | |
| | 5 | 5 | 2.65 | 2.20 | 17 | 49 | 12 |
| | 10 | 10 | 2.39 | 2.12 | 41 | 50 | |
| | 20 | 20 | 2.19 | 2.14 | 59 | 55 | |
| | 40 | 40 | 2.00 | 2.00 | 77 | 62 | |
| 2-(4-bromophenyl)- | 0 (Control) | | 2.79 | | — | | |
| 1,2,4-oxadiazo-lidine-3,5-dione | 12.5 | | 2.34 | | 49 | | |
| | 25 | | 2.20 | | 64 | | 14 |
| | 50 | | 2.01 | | 85 | | |
| 2-(4-trifluoro-methylphenyl)- | 0 (Control) | | 2.81 | | — | | |
| 1,2,4-oxadiazo-lidine-3,5-dione | 12.5 | | 2.24 | | 61 | | |
| | 25 | | 2.14 | | 72 | | 9 |
| | 50 | | 1.93 | | 95 | | |
| 2-(4-trifluoro-methoxyphenyl)- | 0 (Control) | | 7.77 | | — | | |
| 1,2,4-oxadiazo-lidine-3,5-dione sodium salt | 2.5 | | 2.57 | | 21 | | |
| | 5 | | 2.55 | | 23 | | |
| | 10 | | 2.34 | | 44 | | 16 |
| | 20 | | 2.20 | | 59 | | |
| | 40 | | 2.16 | | 63 | | |
| 2-(4-chlorophenyl)-4-carbethoxy-1,2,4-oxadiazoli-dine-3,5-dione | 0 (Control) | | 2.85 | | — | | |
| | 12.5 | | 2.54 | | 32 | | |
| | 25 | | 2.26 | | 61 | | 26 |
| | 50 | | 1.92 | | 96 | | |
| 2-(4-chlorophenyl)-4-methyl-1,2,4-oxadiazolidine-3,5-dione | 0 (Control) | 0 (Control) | 2.65 | 2.69 | — | | |
| | 100 | | 1.86 | | 86 | | 38 |
| | | 25 | | 2.33 | | 43 | |
| | | 50 | | 2.28 | | 49 | |

The compounds of this invention may be employed in pharmaceutical compositions such as injectables and oral dosage forms, for example, tablets, hard gelatin capsules, soft gelatin capsules, oral suspensions, syrups and elixirs. In solid, oral dosage forms, the active ingredient will ordinarily be present in an amount of at least 0.5 percent by weight based on the total weight of the composition and not more than 90 percent by weight.

The dosage administered will be dependent upon the age, health and weight of the recipient, the extent of the disease, kind of concurrent treatment, if any, frequency of treatment and the nature of the effect desired.

These capsules and tablets will usually constitute from about 1 percent to about 95 percent and preferably from 5 percent to 90 percent by weight of active ingredient. These dosage forms preferably contain from about 5 to about 500 milligrams of active ingredient, about 5 to about 100 milligrams being particularly preferred.

In order to obtain high blood levels the compounds of this invention may be micronized prior to use in the pharmaceutical dosage form.

The pharmaceutical carrier can be a sterile liquid such as water or an oil, including those of petroleum, animal, vegetable oils of synthetic origin, for example peanut oil, soybean oil, mineral oil, sesame oil and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.5 percent to 25 percent and preferably about 1 to 10% by weight of the active ingredient.

Liquid oral administration can be in a suitable suspension, syrup or elixir, in which the active ingredient ordinarily will constitute from about 0.5 to 10 percent and preferably about 1 to 5 percent by weight. The pharmaceutical carrier in such composition can be a watery vehicle such as an aromatic water, a syrup, a pharmaceutical mucilage, or a hydro-alcoholic elixir.

Suitable pharmaceutical carriers, diluents and additives are described in "Remington's Pharmaceutical Sciences" by E. W. Martin, a well-known reference text in this field.

The following examples will further illustrate the preparation of pharmaceutical compositions of the invention.

EXAMPLE 17

A large number of unit capsules are prepared by filling standard two-piece hard gelatin capsules each with 50 milligrams of micronized 2-(4-chlorophenyl)-1,2,4-oxadiazolidine-3,5-dione, 300 milligrams of lactose, 32 milligrams of talc and 8 milligrams of magnesium stearate.

EXAMPLE 18

A mixture of 2-(4-chlorophenyl)-1,2,4-oxadiazolidine-3,5-dione in soybean oil is prepared and injected by means of a positive displacement pump into gelatin to form soft gelatin capsules containing 75 milligrams of the active ingredient. The capsules are washed in petroleum ether and dried.

EXAMPLE 19

A large number of tablets are prepared by conventional procedures so that the dosage unit is 300 milligrams of 2-(4-bromophenyl)-1,2,4-oxadiazolidine-3,5-dione, 7 milligrams of ethyl cellulose, 0.2 milligram of colloidal silicon dioxide, 7 milligrams of magnesium stearate, 11 milligrams of microcrystalline cellulose, 11 milligrams of cornstarch and 98.8 milligrams of lactose. Appropriate coatings may be applied to increase palatability or delay absorption.

EXAMPLE 20

An aqueous suspension is prepared for oral administration so that each 5 milliliters contain 50 milligrams of finely divided micronized 2-(4-chlorophenyl)-1,2,4-oxadiazolidine-3,5-dione, 500 milligrams of acacia, 5 milligrams of sodium benzoate, 1.0 gram of sorbitol solution, U.S.P., 5 milligrams of sodium saccharin and 0.025 milliliters of vanilla tincture.

EXAMPLE 21

A parenteral composition suitable for administration by injection is prepared by dissolving 1 percent by weight of the active ingredient as the sodium salt in water for injection U.S.P. and adjusting the pH of the solution to between 7 and 7.5. The solution is sterilized by heat or filtration.

A wide variety of compositions coming within this invention can be prepared by substituting other compounds of this invention, including specifically but not limited to those compounds named hereinbefore, for the compounds named in the Examples above and substituting other suitable pharmaceutical carriers well known and described in the Martin text mentioned above.

I claim:

1. A compound selected from the group consisting of 2-(4-trifluoromethoxyphenyl)-1,2,4-oxadiazolidine-3,5-dione, and its sodium, potassium, ammonium, calcium, and magnesium salts.

2. 2-(4-chlorophenyl)-4-carbethoxy-1,2,4-oxadiazolidine-3,5-dione.

* * * * *